(12) United States Patent
Wallace et al.

(10) Patent No.: US 11,755,964 B2
(45) Date of Patent: Sep. 12, 2023

(54) TRAVEL PACKAGES INCLUDING SEPARATELY PURCHASED TRAVEL ITEMS

(71) Applicant: Expedia, Inc., Seattle, WA (US)

(72) Inventors: Glenn William Wallace, Redmond, WA (US); Barbara Perks, Mercer Island, WA (US); Michael Edward Hamm, Everett, WA (US); Jada Michelle Williams, Seattle, WA (US); William George Long, Bellevue, WA (US); Derek John Zumsteg, Bellevue, WA (US); Michael Stephen Tuck-Lee, Kenmore, WA (US); Lam Chi Ha, Bothell, WA (US)

(73) Assignee: Expedia, Inc., Seattle, WA (US)

( * ) Notice: Subject to any disclaimer, the term of this patent is extended or adjusted under 35 U.S.C. 154(b) by 0 days.

(21) Appl. No.: 17/444,646

(22) Filed: Aug. 6, 2021

(65) Prior Publication Data

US 2022/0101211 A1 Mar. 31, 2022

Related U.S. Application Data

(63) Continuation of application No. 14/073,252, filed on Nov. 6, 2013, now abandoned, which is a
(Continued)

(51) Int. Cl.
*G06Q 10/02* (2012.01)
*G06Q 30/0207* (2023.01)
*G06Q 50/14* (2012.01)

(52) U.S. Cl.
CPC .......... *G06Q 10/025* (2013.01); *G06Q 10/02* (2013.01); *G06Q 30/0207* (2013.01); *G06Q 50/14* (2013.01)

(58) Field of Classification Search
CPC .................................................. G06Q 10/025
See application file for complete search history.

(56) References Cited

U.S. PATENT DOCUMENTS

| 5,481,094 A | 1/1996 | Suda |
| 6,493,714 B1 | 12/2002 | Beaven et al. |

(Continued)

FOREIGN PATENT DOCUMENTS

| AU | 2011336865 | 2/2017 |
| CA | 2820632 C | 4/2017 |

(Continued)

OTHER PUBLICATIONS

Ricci, Francesco, and Fabio Del Missier. "Personalized product recommendation through interactive query management and case-based reasoning." Proceedings of CHI'03 Workshop on Designing Personalized User Experiences for eCommerce. 2003. (Year: 2003).*

(Continued)

*Primary Examiner* — Scott M Tungate
(74) *Attorney, Agent, or Firm* — Knobbe, Martens, Olson & Bear, LLP

(57) ABSTRACT

A user of a personal computing device may identify multiple travel items of interest displayed for purchase by a network-based travel service. However, the user may not desire to purchase the travel items in a single purchase. Upon making a travel purchase that includes a first travel item that does not include a second travel item corresponding to the first travel item, the user may employ the network travel package service to search for second travel items corresponding to the first travel item, select from discounted travel packages including the first travel item and second travel items returned from the search, and purchase a discounted travel package. Beneficially, multiple travel items may be pur-
(Continued)

chased separately while obtaining a package discount as compared to the stand-alone price of the travel items.

21 Claims, 10 Drawing Sheets

Related U.S. Application Data continuation of application No. 12/957,334, filed on Nov. 30, 2010, now Pat. No. 8,600,805.

(56) References Cited

U.S. PATENT DOCUMENTS

| | | | |
|---|---|---|---|
| 7,363,242 B2 | 4/2008 | Lewis et al. | |
| 7,899,710 B1 | 3/2011 | Walker | |
| 8,600,805 B2 | 12/2013 | Wallace et al. | |
| 2002/0069093 A1 | 6/2002 | Stanfield | |
| 2002/0072937 A1 | 6/2002 | Domenick et al. | |
| 2002/0116232 A1 | 8/2002 | Rapp et al. | |
| 2003/0036930 A1 | 2/2003 | Matos et al. | |
| 2003/0050865 A1 | 3/2003 | Dutta et al. | |
| 2004/0103025 A1 | 5/2004 | Ulf et al. | |
| 2004/0254819 A1 | 12/2004 | Halim et al. | |
| 2006/0064410 A1* | 3/2006 | Razza | G06F 16/958 |
| 2006/0155639 A1* | 7/2006 | Lynch | G06Q 40/025 |
| | | | 705/38 |
| 2007/0192186 A1 | 8/2007 | Greene et al. | |
| 2007/0229222 A1* | 10/2007 | Leeds | G06F 16/9535 |
| | | | 340/5.91 |
| 2007/0260495 A1 | 11/2007 | Mace et al. | |
| 2008/0095492 A1 | 8/2008 | Postrel | |
| 2008/0198761 A1 | 8/2008 | Murawski et al. | |
| 2008/0262878 A1 | 10/2008 | Webby et al. | |
| 2009/0030741 A1 | 1/2009 | Veitch | |
| 2010/0010841 A1 | 1/2010 | Cooper et al. | |
| 2010/0114654 A1* | 5/2010 | Lukose | G06Q 30/0256 |
| | | | 705/14.54 |
| 2010/0257020 A1 | 10/2010 | Bryant | |
| 2011/0082748 A1* | 4/2011 | Manu | G06Q 30/02 |
| | | | 705/14.58 |
| 2011/0131089 A1 | 6/2011 | Walker et al. | |
| 2012/0136683 A1 | 5/2012 | Wallace et al. | |
| 2014/0067442 A1 | 3/2014 | Wallace et al. | |

FOREIGN PATENT DOCUMENTS

| | | |
|---|---|---|
| JP | 2002-083186 A | 3/2002 |
| JP | 2006-268782 A | 10/2006 |
| JP | 5726322 B | 4/2015 |
| WO | WO 2012/074939 A1 | 6/2012 |

OTHER PUBLICATIONS

"Booking the Right Trip Just Got Easier on Expedia.com; Enhanced Air, Hotel, and Car Offerings Save Travelers Time and Money". PR Newswire. Oct. 30, 2003.

"Beagle Research Recognizes PAR3 in CRM 'WizKids' Report for Customer Communication Solution in Use at US Airways". PR Newswire, pp. 1-3, Feb. 3, 2005.

International Search Report and Written Opinion in PCT Application No. PCT/US11/62265 dated Jan. 6, 2012.

Kavanagh, Margaret; "Save Money by Finding the Best Travel Deals Online," Inside the Internet; vol. 12, No. 11; p. 1; Nov. 2005.

Office Action in Australian Application No. 2011336865 dated Mar. 18, 2016 in 3 pages.

Office Action in Canadian Application No. 2,820,632 dated Dec. 11, 2014 in 6 pages.

Office Action in Canadian Application No. 2,820,632 dated Sep. 25, 2015 in 6 pages.

Office Action in Indian Application No. 1871/KOLNP/2013 dated Sep. 18, 2019 in 10 pages.

Office Action in Japanese Application No. 2013-542080 dated May 26, 2014 in 9 pages.

Tao, Yufei. "Queries in Spatio-temporal Databases, Time Parameterized." Encyclopedia of GIS. Spring, Boston, MA, 2008. 939-942.

Wuebker, Georg, "'Bundles' Effectibeness is Often Undermined," Marketing News; vol. 36, No. 6; p. 9; Mar. 18, 2002.

Ypsilon Newsletter 9accessed Jun. 8, 2009, available at "http://web.archive.org/web/20090608173133/http:/www2.ypsilon.net/new/hotel-newsletter-en.html").

* cited by examiner

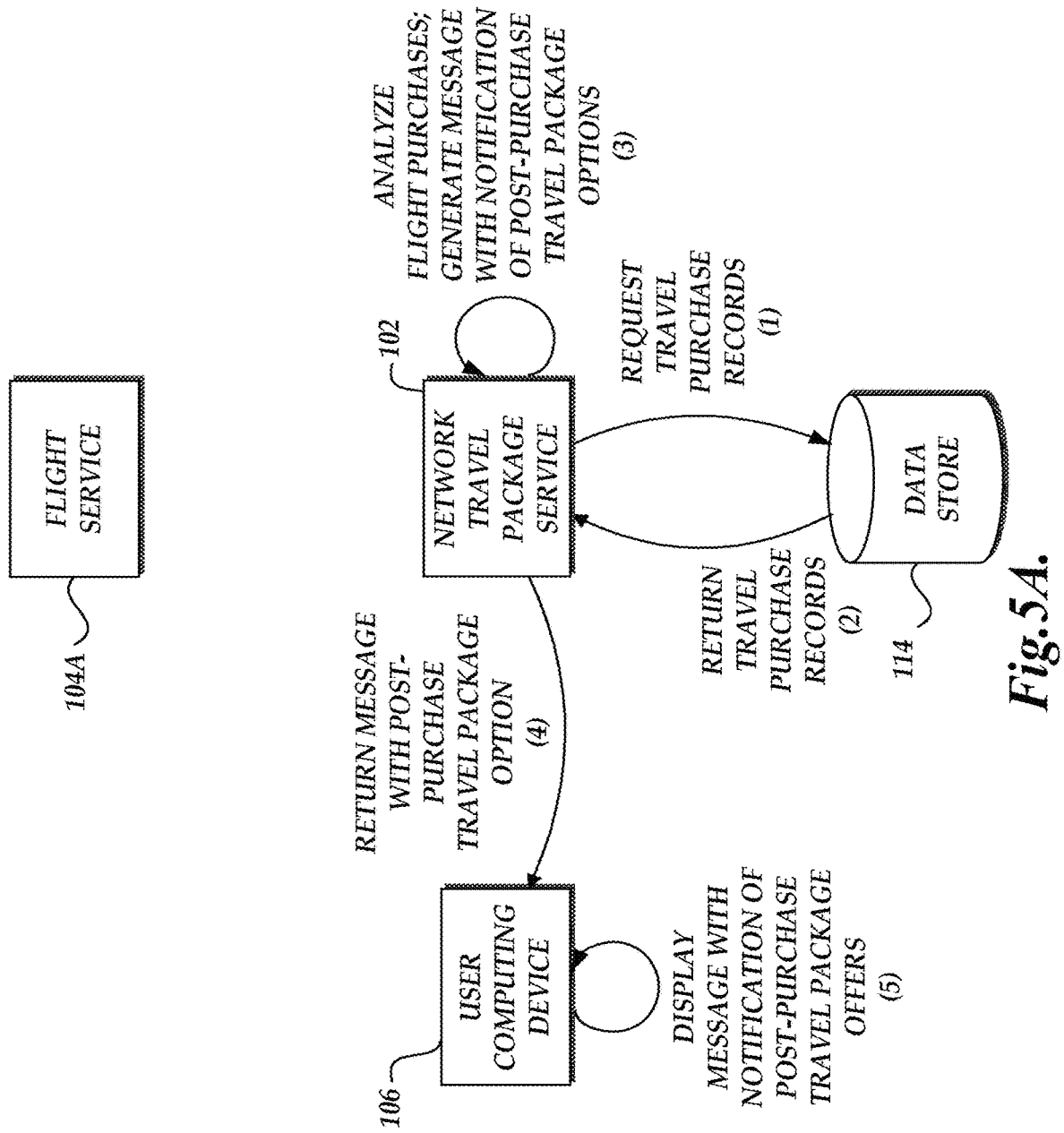

TRAVEL PACKAGES INCLUDING SEPARATELY PURCHASED TRAVEL ITEMS

CROSS-REFERENCE TO RELATED APPLICATIONS

This application is a continuation of U.S. patent application Ser. No. 14/073,252, entitled "TRAVEL PACKAGES INCLUDING SEPARATELY PURCHASED TRAVEL ITEMS," and filed Nov. 6, 2013, which is a continuation of U.S. patent application Ser. No. 12/957,334, now U.S. Pat. No. 8,600,805, entitled "SYSTEMS AND METHODS FOR GENERATING TRAVEL PACKAGES INCLUDING SEPARATELY PURCHASED TRAVEL ITEMS," and filed Nov. 30, 2010, the entireties of which are incorporated herein by reference.

BACKGROUND

Computing devices and computing networks are frequently employed by users to make purchases. For example, a user may purchase an item from a network-based retailer using his or her personal computing device. In particular, the practice of purchasing travel items has been made significantly easier with the advent of network-based travel services. By employing network-based travel services, users may search for travel items, compare travel items offered for sale by multiple providers, and purchase travel items via his or her own computer. Beneficially, users may shop for travel items at their own pace and convenience, without pressure and in the comfort of their home or office.

Network-based travel services may also afford users the opportunity to purchase travel packages that include multiple travel items at a discount. For example, when considering the booking of a hotel reservation, an auto rental may also be offered at a discount. In this manner, the user may purchase a travel package including the hotel reservation and auto rental at a discount over the price of booking the hotel and auto individually.

Unfortunately, travel package discounts are typically offered only when purchasing travel items together at the same time. For a variety of reasons, though, some users may not choose to purchase multiple travel items together. In one instance, a user may wish to purchase a first travel item and wait to consult with a travel companion before purchasing additional travel items. In another instance, a user may not wish to spend the amount required to purchase multiple travel items in a single purchase. Thus, some users may be denied the discounts provided with travel packages when purchasing travel items separately.

BRIEF DESCRIPTION OF THE DRAWINGS

The forgoing aspects and many of the attendant advantages will become more readily appreciated as the same become better understood by reference to the following detailed description, when taken in conjunction with the accompanying drawings, where:

FIG. 5A is a block diagram of the operating environment of FIG. 1, illustrating the network travel package service providing a message to the user computing device that notifies the user of the possibility of adding one or more corresponding travel items to an initial travel item purchase in a deferred travel package;

DETAILED DESCRIPTION

Figure 1:
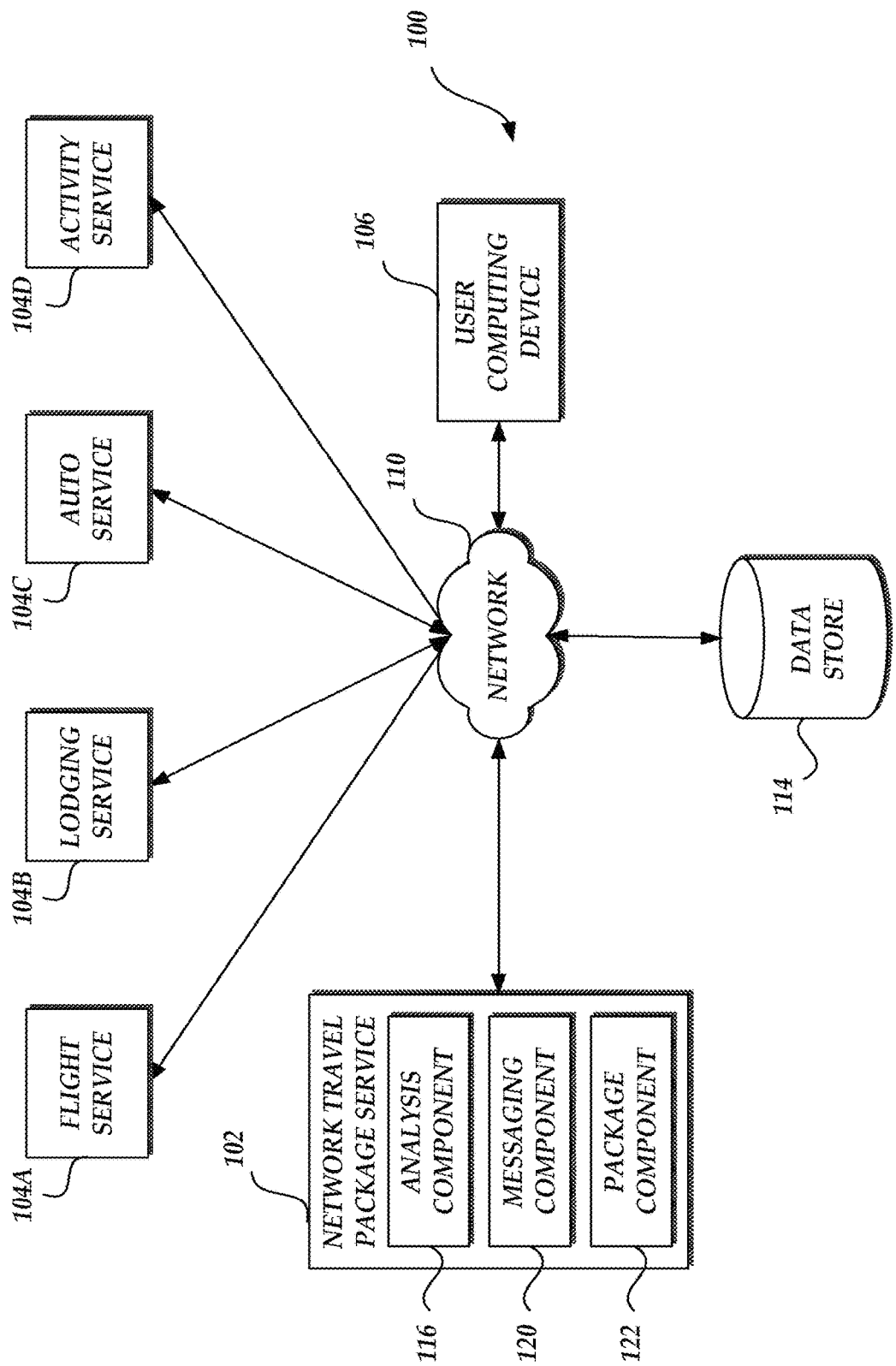
FIG. 1 is a schematic block diagram of an illustrative network travel package service for enabling the purchase of deferred travel packages by a user employing a user computing device.

Embodiments of the present disclosure provide systems and methods for the purchase of multiple travel items (e.g., a travel package) at a discount as compared to the stand-alone price of the travel items, where the multiple travel items are purchased separately at different times. The travel items may include any transportation goods or services (e.g., flights, lodging, automobiles, buses, trains, etc.) or other goods or services related to activities (concerts, sporting events, amusement parks, travel insurance, etc.). In particular, a discounted travel package may combine a first travel item, which is initially purchased without another corresponding travel item (and without a travel package discount), and one or more second, corresponding travel items that are selected after purchase of the first travel item, e.g., later in the same shopping session or during a different shopping session, as described in greater detail below. A package discount may be applied to the combined first travel item and the one or more second travel items, even though the one or more second travel items are purchased after the first travel item is purchased. Travel packages purchased in this fashion may be referred to herein as deferred travel packages.

Corresponding travel items may include first travel items and second travel items that possess a selected relationship with respect to one another. In one embodiment, the first and second travel items may possess a selected temporal relationship, where the travel items possess dates of use that start and/or finish within a selected time period with respect to one another. For example, if the first travel item is a round-trip flight and the second travel item is lodging, a lodging stay corresponding to the round-trip flight may be required to occur between the departing and returning flights. In another embodiment, the first and second travel items may possess a selected positional relationship, where the travel items are initially and/or finally used within a selected distance of one another. Continuing the flight and lodging example above, a lodging stay corresponding to the round-trip flight may be required to occur within a selected distance (e.g., radius) of the departure and/or arrival airports.

As described herein, the first, or initial, travel item purchase included in a generated deferred travel package may include one or more travel items that are purchased without further corresponding travel items. For example, the initial travel item purchase may include a flight which is purchased without corresponding lodging. In another embodiment, the initial travel item purchase may include multiple travel items. For example, the initial travel item purchase may include a flight which is purchased with corresponding lodging but without a corresponding auto rental.

In this regard, a network travel package service is described for generating deferred travel packages for purchase by a traveler. The network travel package service may be implemented as a component of, or a provider to, a network-based travel service, such as a travel website, that sells travel-related goods, services, activities, etc., or may be a stand-alone service that generates deferred travel packages. For example, a traveler, employing a user computing device, may purchase a deferred travel package that includes the initial travel item purchase directly from the stand-alone network travel package service.

Upon identifying an initial travel item purchase made by or for the traveler, the travel package service may provide the traveler with the option to purchase one or more additional travel items. These additional travel items may correspond to the initial travel item and may be provided for purchase at a discounted price as part of a deferred travel package that includes the initial travel item purchase. These additionally purchased travel items may be further referred to herein as additional packaged travel items. It may be understood that the initial travel item purchase may be purchased via the travel package service, purchased from an affiliated service, purchased offline (e.g., from a travel agent or other offline service), or may be purchased from a third party service.

In one embodiment, initial travel purchases may be identified by analyzing travel purchase records for a traveler. The network travel package service may provide the traveler with the option to purchase additional packaged travel items as part of a deferred travel package in an electronic message or other communication that is transmitted to the traveler. Such messages and communications may include, but are not limited to, electronic mail (e-mail) messages, a short message service (SMS) messages, instant messages (IM), hypertext markup documents (HTML), and other messaging technologies known to those of skill in the art. In one aspect, the message may indicate that the traveler may achieve savings when purchasing additional packaged travel items in addition to their initial travel item purchase, as compared to the price of the respective travel items when purchased separately (e.g., as stand-alone items). In another aspect, the message may include a link (e.g., a hypertext link) that enables a network navigation component executing on the traveler's user computing device to navigate to a portion of the network travel package service for purchase of a deferred travel package.

For example, the network travel package service may identify that the traveler has made an initial travel item purchase and subsequently transmit an e-mail message to the traveler offering the option to purchase one or more additional packaged travel items. As discussed in greater detail below, should the traveler select the link, the traveler may be directed to a search user interface of the network travel package service, where a search for additional packaged travel items may be performed.

In another embodiment, a traveler may transmit a request to the network travel package service to add one or more additional travel items to an existing initial travel purchase. For example, the network travel package service may offer the traveler the option to purchase lodging corresponding to an initial flight purchase at a discounted, package price, e.g., a price discounted with respect to that which would have been offered if the lodging and flight were purchased simultaneously as a travel package.

In another embodiment, the network travel package service may provide the traveler with the option to purchase additional packaged travel items from a user interface of the network travel package service. For example, a traveler navigating to or within the network travel package service may be identified, along with any initial travel item purchases made by the traveler. The network travel package service may further provide a user interface which presents the traveler with the option to purchase additional packaged travel items. The traveler may select an initial travel item for inclusion in a deferred travel package from the user interface, as well perform a search for additional packaged travel items. In one embodiment, a search user interface provided by the network travel package service may enable the traveler to submit one or more search parameters for identification of additional packaged travel items. For example, assuming that an initial flight purchase is identified, the traveler may respond to an invitation to purchase lodging and submit one or more search parameters related to a lodging stay. Such parameters may include, but are not limited to, check-in date, check-out date, type of bed, quality of lodging establishment (e.g., minimum star rating, minimum customer ratings), quality of room (single room, suite, etc.), name of property, distance to selected location, price range, and the like.

In certain embodiments, the network travel package service may also restrict the ability to search for the additional packaged travel items. For example, the network travel package service may limit searches to travelers who have purchased initial travel items. Such search limitations may inhibit travelers who have not purchased initial travel items from searching for and purchasing travel items at a discounted, package price.

Results returned from the search for additional packaged travel items may be transmitted to the network travel package service for the generation of deferred travel packages. In one embodiment, deferred travel packages may be generated by determining valid combinations of initially purchased travel items and subsequently selected, additional travel package items that are eligible to receive travel package discounts, and further pricing these valid combinations. Upon completing the generation of one or more deferred travel packages, the network travel package service may provide information regarding the deferred travel packages, including pricing information, to the user computing device to allow the traveler to review and select a deferred travel package for purchase.

In one embodiment, the deferred travel packages including valid combinations of initially purchased travel items and additional packaged travel items may be generated according to one or more rules. The rules may be prepared prior to the generation of the deferred travel packages and may be retrieved from a storage device. The rules may include one or more requirements placed upon the use of the respective travel items by the travel item provider (e.g., an airline in the case of a flight, a lodging operator in the case of lodging, etc.).

In one aspect, the rules may specify which combinations of initially purchased travel items may be combined with additional packaged travel items to form a valid deferred travel package eligible for savings. In certain embodiments, such rules are specified by the network travel package service. The rules may specify a selected distance separating use of the initial travel item purchase and the additional travel item in order to qualify the respective items as corresponding. For example, assuming an initially purchased flight and prospective additional lodging purchase, the network travel package service may specify the distance that the additionally purchased lodging may be from a destination airport of the flight in order to qualify as corresponding to the initially purchased flight. In another aspect, the rules may specify the time of use of the initial travel item purchase and the additional packaged travel item in order to qualify the respective items as corresponding. For example, continuing the example above, the rules may specify whether the lodging stay may be outside a trip duration according to the flight departure and return and, if so, for how long.

In other embodiments, rules may be determined by providers of the travel items. For example, a travel service provider may limit the total number of travel items which may be sold at a package discount by the network travel package service. For example, a selected lodging provider may make twenty-five rooms available for purchase at a discounted, deferred package price with an initial travel item purchase, such as a flight. After the network travel package service has sold the allocated twenty five rooms, rooms provided by the selected lodging provider may no longer be eligible for inclusion in any deferred travel package.

In another aspect, the rules may specify the pricing of valid deferred travel packages. For example, the pricing rules may specify a deferred travel package price including a base price and a travel package discount. The base price may be the price of the respective travel items of the deferred travel package priced as stand-alone items. The deferred travel package discount may be based upon the stand-alone rate for the additional packaged travel item and a package rate for the additional packaged travel item. The offered cost of the travel package may be less than or equal to the base price. The rules may further specify modifications to the travel package discount, such as modifications based upon the time (e.g., decreasing the deferred travel package discount as the time remaining until first use of the initially purchased travel item decreases).

In alternative embodiments, the price of respective deferred travel packages may instead be obtained from cached results stored for deferred travel packages searches. The cached deferred travel packages may be deferred travel packages previously generated in response to traveler requests or may be generated based upon popular combinations of travel items (e.g., destinations, times, etc.). The network travel package service may compare traveler requests with the cached deferred travel packages and, if a match is, found employ a matching cached deferred travel package to price the traveler's request.

In some embodiments, the network travel package service may enable purchase of a deferred travel package within the same session or across multiple sessions. While discussed in greater detail below, a session may include a navigation session, by an instance of a network navigation component (e.g., a web browser), executed by the user computing device of the traveler, to the network travel package service for purchase of travel items. Navigation away from the network travel package service may constitute the end of the session.

In one embodiment, the network travel package service may enable the purchase of additional packaged travel items after the initial travel item purchase and prior to navigation away from the network travel package service by the user computing device. Accordingly, the network travel package service may provide the option to purchase a discounted travel package within a single session. For example, a notification that deferred travel package options (e.g., options to purchase lodging corresponding to an initial flight purchase) may be included in a message confirming purchase of a travel item that allows navigation to a search user interface of the network travel package service, from which additional travel items may be searched and purchased, provided the purchased travel item is an initial travel item. Alternatively, the network travel package service may provide the search user interface to the traveler directly after purchase of the initial travel item purchase.

Similarly, by enabling the purchase of additional packaged travel items after the purchase of the initial travel item, and after navigation away from the travel package service by the user computing device, the network travel package service may enable purchase of a discounted travel package across multiple sessions. For example, the network travel package service may provide messages (e.g., e-mail messages) to the traveler, after the traveler has navigated away from the network travel package service, that include a notification that deferred travel package options are available to the traveler. In another example, travelers may return to the network travel package service and search for additional packaged travel items to combine with a previous initial travel item purchase in a deferred travel package after completing the initial travel item purchase and navigating away from the network travel package service.

With reference to FIG. 1, an illustrative operating environment 100 is shown, including a network travel package service 102 for generating deferred travel packages. Additional travel items may be purchased by the traveler via a user computing device 106 in communication with the network travel package service 102. In one embodiment, the network travel package service 102 is a travel website that sells travel items, travel services, activities, and the like.

The user computing device 106 may include any communication device capable of communicating with the network travel package service 102, such as a personal computer (PC), a kiosk, a thin client, a home computer, and a dedicated or embedded machine. Further examples may include without limitation laptop or tablet computers, personal computers, personal digital assistants (PDAs), hybrid PDAs/mobile phones, mobile phones, electronic book readers, set-top boxes, and the like.

In one embodiment, the user computing device 106 may communicate with the network travel package service 102 via a communication network 110, such as the Internet or a communication link. Those skilled in the art will appreciate that the network 110 may be any wired network, wireless network or combination thereof. In addition, the network 110 may be a personal area network, local area network, wide area network, cable network, satellite network, cellular telephone network or combination thereof. Protocols and components for communicating via the Internet or any of the other aforementioned types of communication networks are well known to those skilled in the art of computer communications and thus, need not be described in more detail herein.

It will be recognized that many of the components described herein are optional and that embodiments of the operating environment 100 may or may not combine components. Additionally, the components need not be distinct or discrete. Components may be reorganized in the operating environment 100. The operating environment 100 may be represented in a single physical server containing all of the subsystems described below or, alternatively, may be split into multiple physical servers. For example, in certain embodiments, the network travel package service 102 may be implemented as a network-based service offering a variety of travel services and search capabilities (e.g., a travel website). In alternative embodiments, the network travel package service 102 may include a stand-alone service.

The network travel package service 102 may be embodied in a plurality of computing components, each executing an instance of the network travel package service 102. A server or other computing component implementing the network travel package service 102 may include a network interface, memory, processing unit and computer-readable medium drive, all of which may communicate with each other by way of a communication bus. The network interface may provide connectivity over the network 110 and/or other networks or computer systems. The processing unit may communicate to and from memory containing program instructions that the processing unit executes in order to operate the network travel package service 102. The memory generally includes RAM, ROM and/or other persistent and auxiliary memory.

In certain embodiments described herein, the network travel package service 102 may be employed to search for and purchase travel items. For example, the network travel package service 102 may provide user interfaces that enable the submission of search queries for travel items and the selection of returned travel items for purchase. The search queries may include search parameters including, but not limited to, the type of travel item of interest, dates and times of interest for travel, specific travel providers (e.g., specific lodging, airlines, rental car companies, etc.), class of travel (e.g., first class, five star, etc.), location (arrival/departure location, location near, etc.) and the like. In certain embodiments described herein, the search query is illustrated as communicated from a traveler (or his or her representative) employing his or her user computing device 106. It may be understood, however, that the search query may originate from any number of sources, such as third party travel servers, applications or carriers.

In further embodiments, described in greater detail below, the network travel package service 102 may restrict of the ability of travelers to submit search queries for additional travel items for incorporation into a travel package with previously purchased travel items. It may be desirable to restrict searching for additional travel items only to travelers who have made an initial travel purchase. In this manner, travelers who have made an initial travel purchase may receive travel package discounts and travelers who have not made an initial travel purchase may not receive travel package discounts for purchases of non-corresponding travel items.

The network travel package service 102 may communicate a received search query to one or more network inventory services 104A-104D in order to identify travel items that satisfy the search query. In certain embodiments, two or more of the network inventory services 104A-104D may be integrated together in any combination to provide the functionality of their respective services. In alternative embodiments, one or more of the network inventory services may be local to the network travel package service 102 or a part of the network travel package service 102.

The network inventory services 104A-104D may be configured to provide information regarding travel inventory items in response to queries (e.g., electronic queries). The network inventory services 104A-104D may include up-to-date information regarding fares (prices or costs for travel items), schedules (dates and times of arrival and departure, check-in and checkout, pickup and drop-off, and the like), fare rules (which fares are valid under a given set of circumstances) and availability (capacity) for respective travel items maintained therein. For example, a flight service 104A may maintain information regarding travel items such as airline flights, while a lodging service 104B may maintain information regarding travel items such as lodging for rent (e.g., hotels, motels, houses, apartments, condominiums, and the like). An auto service 104C may maintain information regarding travel items including, but not limited to, trains, buses, ferries, shuttle services, and cruises, as well as automobiles. An activity service 104D may maintain information regarding travel items such as activities and attractions including, but not limited to, concerts, sporting events, amusement parks, meals at a restaurant, equipment rental (e.g., golf equipment rental), and the like. In alternative embodiments, information regarding fares, schedules, fare rules and availability may be maintained by a separate service in communication with the network inventory services 104A-104D.

In certain embodiments, the search query may be relayed from the network travel package service 102 to the network inventory services 104A-104D. In response to receiving the search query, the network inventory services 104A-104D may return availability and pricing information for one or more travel items that satisfy the submitted query specifications. It will be appreciated by those of skill in the art that a variety of routines for finding fares in response to a received search query may be performed. In one embodiment, flights may be searched for according to the flight search routine described in U.S. patent application Ser. No. 09/825,451, "OPTIMIZED SYSTEM AND METHOD FOR FINDING BEST FARES," the entirety of which is hereby incorporated by reference. In further embodiments, other search techniques as understood in the art may be performed without limit.

The network travel package service 102 may provide travel items returned by the search to the user computing device 106 for review and selection. In turn, the user computing device 106 may return one or more travel item selections and payment authorization to the network travel package service 102. Upon receiving the travel item selection and payment authorization, the network travel package service 102 may authorize the corresponding network inventory services 104A-104D to purchase the selected travel items. Records of the purchased travel items may be stored in a data store 114 in communication with the network travel package service 102 and/or one or more storage devices local to the network travel package service 102. The data store 114 may represent one or more memory devices in communication with the network 110 and/or local to the network travel package service 102. In other embodiments, the data store 114 may be a network-based service.

With further reference to FIG. 1, illustrative components of the network travel package service 102 for use in generating discounted travel packages that include multiple, travel items purchased separately at different times will now be described. In one embodiment, the network travel package service 102 may include an analysis component 116 for analyzing travel purchases to identify initial travel item purchases. In another embodiment, the network travel package service 102 may include a messaging component 120 for generating messages including notifications that deferred travel package options are available to the traveler for purchase. In a further embodiment, the network travel package service 102 may include a package component 122 for generating and pricing deferred travel package options.

As described in greater detail below, in certain embodiments, the analysis component 116 and/or messaging component 120 may be omitted from the network travel package service 102. The package component 122 may be configured to receive and respond to user requests for additional packaged travel items that are not in response to a received message. For example, the package component 122 may be operative to receive traveler requests to add additional travel items to a selected, initial travel item purchases from a user interface generated by the network travel package service 102.

Generally described, the analysis component 116 may analyze travel purchases in order to identify travel purchases that include initial travel item purchases. For example, an initial travel item purchase may include purchase of a travel item without any corresponding travel items, such as a flight for a traveler without the purchase of corresponding lodging. In another example, an initial travel item purchase may include purchase of a travel item with one corresponding travel item, such as purchase of a flight with corresponding lodging but without a corresponding auto rental.

The analysis component 116 may obtain records of selected travel purchases in order to perform analysis. In one embodiment, the records obtained by the analysis component 116 may be analyzed to identify travel purchases made for a selected traveler (e.g., travel purchases in the name of the traveler). In another embodiment, travel purchases made for the selected traveler may be further analyzed to identify whether they include initial travel item purchases. In a further embodiment, travel purchases made for the selected traveler may also be analyzed to identify whether they include or exclude a selected travel item. For example, assuming an initial travel item purchase for a selected traveler is a flight, the analysis component 116 may analyze the purchase to determine that the initial travel item purchase excludes lodging corresponding to the flight.

In one embodiment, travel purchase records may be obtained directly from the network inventory services 104A-104D at about the time of purchase. In alternative embodiments, travel purchase records may be obtained from stored travel purchase records maintained in the data store 114 and/or storage devices local to the network travel package service 102. Should a travel purchase be identified as including an initial travel item purchase, the analysis component 116 may note the travel purchase for further processing, discussed in greater detail below.

In certain embodiments, the network travel package service 102 may enable the purchase of deferred travel packages, including one or more additional packaged travel items and the initial travel item purchase, within the same session or over multiple sessions. In one embodiment, a session may be described with respect to network navigation by a network navigation component (e.g., a web browser) executed by the user computing device 106. A session may begin when an instance of the network navigation component is made to navigate to the network travel package service 102. A session may end when the instance of the network navigation component navigates away from the network travel package service 102. For example, a shopping session may include employing one or more functions of the network travel package service 102 without navigating away from the network travel package service 102. These functions may include, but are not limited to, searching for travel items, reviewing search results, purchasing selecting travel items returned from the search, and the like. Once the traveler has completed their desired operations using the network travel package service 102, such as purchasing a travel item, the traveler may navigate away from the network travel package service 102 to end the session.

In another embodiment, a session may be also described with respect to operation of the network navigation component executed by the user computing device 106. In this case, however, a session is described as beginning when the network navigation device makes a first request to a selected network resource, such as a web page maintained by a server. The session with the network resource may continue until the instance of the network navigation component is deactivated (e.g., closed).

In one embodiment, the network travel package service 102 may enable purchase of the additional travel items within the same session as the single travel item purchase using the messaging component 120. For example, the messaging component 120 may generate a confirmation message at about the same time that a travel item is purchased, provided that the travel item is identified as being an initial travel item (e.g., using the analysis component 116). The message may further include a notification that deferred travel package options are available for purchase. Selecting a link (e.g., a hyperlink) within the notification may enable the network travel package service 102 to provide the traveler with a search user interface that enables the traveler to search for additional packaged travel items, review deferred travel package options, and purchase additional packaged travel items separately from the initial travel item purchase.

In alternative embodiments, the network travel package service 102 may provide the traveler with the search user interface directly. For example, in response to identification of the initial travel item purchase, the network travel package service 102 may provide the traveler with the search user interface, including one or more initial travel item purchases. Subsequently, as described in greater detail below, the traveler may select an initial travel item purchase, perform a search for additional packaged travel items, review deferred travel package options including the selected initial travel item purchase and separately purchase additional travel items within a deferred travel package.

In this manner, the traveler, employing their user computing device 106, may purchase additional travel items prior to navigating away from the network travel package service 102 or terminating their network navigation component. Therefore, the traveler may purchase additional packaged travel items while remaining within the same session as the purchased initial travel item.

In other embodiments, the messaging component 120 may enable the purchase of the additional packaged travel items over multiple sessions. For example, a selected time after the traveler has navigated away from the network travel package service 102, the analysis component 116 may obtain records regarding an initial travel item purchase. In one embodiment, these records may be obtained from the respective network inventory service 104A-104D, the data store 114, and/or records stored locally by the network travel package service 102 (e.g., from a local folder containing travel item purchases made within a selected time period). In other embodiments, the records may enable identification that the traveler has purchased an initial travel item. In response, the messaging component 120 may generate one or more messages, including a notification that deferred travel package options are available, for transmission to the user computing device 106. In one example, the electronic messages may include e-mail messages. In alternative embodiments, the messages may include short message service (SMS) messages, instant messages (IM), hypertext markup documents (HTML), and other messaging technologies known to those of skill in the art. These messages may be transmitted to the traveler prior to first use of a selected initial travel item purchase by the traveler in order to encourage purchase of additional packaged travel items. As discussed above, selection of a link, such a hyperlink, within the notification of deferred travel package options may enable the network travel package service 102 to provide the traveler with a search user interface that enables the traveler to search for additional packaged travel items, review and purchase deferred travel package options, or purchase additional packaged travel items separately from the initial travel item purchase.

In another embodiment, the network travel package service 102 may enable the purchase of the additional packaged travel items over multiple sessions in response to a traveler request without a transmitted message. For example, after purchase of an initial travel item, a traveler may navigate away from the network travel package service 102 and later return to the network travel package service 102 to begin another session. For example, the traveler may make an initial travel item purchase using the network travel package service 102 on one day, navigate from the network travel package service 102 to perform other tasks using his or her network navigation device, and then return to the network travel package service 102 on another day.

The network travel package service 102 may authenticate the traveler's identity on return to the network travel package service 102. Such an authentication may enable the network travel package service 102 to identify the traveler and any of their initial travel item purchases. Subsequently, the traveler may select an initial travel item purchase and search for additional packaged travel items for inclusion within a deferred travel package. The traveler may select from generated deferred travel packages in order to purchase additional packaged travel items.

The network travel package service 102 may provide notification that deferred travel package options are available in a variety of ways. In one embodiment, the notification may be provided within a welcome user interface of the network travel package service 102. In another example, once navigating to the network travel package service 102 and authenticated, the traveler may request an itinerary for a selected initial travel item purchase. In response to the request, a record of the initial travel item purchase may be retrieved (e.g., from sources such as a purchase history maintained by the data store 114 and/or a storage device local to the network travel package service 102) The notification that deferred travel package options are available may be included within the returned itinerary.

In a further example, a notification that deferred travel package options are available may be included in user interfaces of the network travel package service 102 triggered by selected actions performed by the identified traveler within the network travel package service 102 using his or her network navigation device. For example, a new user interface (e.g., a pop-up window) that includes the notification may be provided in response to submission of a search query for travel items using the network based travel package service 102.

Upon selection of link within the notification provided by the network travel package service 102, the network travel package service 102 may enable the traveler to submit queries for additional packaged travel items. The search may be performed as described above with respect to the initial travel item purchase using the network inventory services 104A-104D. For example, an electronic search query may be submitted to one or more of the network inventory services 104A-104D directly or via the network travel package service 102. The search query and search results may be further indicated as intended for inclusion within a deferred travel package.

In certain embodiments, when the traveler attempts to communicate with the network travel package service 120 to submit a search query for additional packaged travel items, an authentication process may first be performed. The authentication process may be employed to identify the traveler and confirm that the traveler has made one or more initial travel item purchases. The traveler's identity may be identified by mechanisms including, but not limited to, exchanging authentication codes (e.g., passwords), authentication files (e.g., web browser cookies), or other mechanisms known in the art for providing identification between computing devices. Upon identifying the traveler, the network travel package service 102 may search travel records, such as records of travel item purchases and/or records of recent travel item purchases to confirm the traveler's travel item purchases. These records may be maintained by data store 114 and/or travel records stored locally by the network travel package service 102. Travel package discounts may not be provided for purchase of any returned search result for travel items in the event that the traveler's identity and/or the travelers initial travel item purchase cannot be established.

Search results returned for the additional packaged travel items may be communicated to the network travel package service 102 for use by the package component 122 in generating deferred travel packages. The package component 122 may obtain one or more rules from the data store 114 to facilitate generation of the deferred travel packages. As discussed below, in an embodiment, the package component 122 may employ these rules to identify additional packaged travel items returned from the search that correspond to the initial travel item purchase and are therefore eligible to be combined with the initial travel item purchase in a deferred travel package. In another embodiment, the package component 122 may employ these rules to determine the cost of the generated deferred travel packages.

In one aspect, the package component 122 may obtain rules which specify the correspondence between respective travel items based upon their location of use. Specifically, the respective travel items may be required to be used within a selected distance of one another. In certain embodiments, distances may be based upon any of the respective points of origin, departure, pickup and drop-off of the travel items, as well as location of an activity. For example, assuming that the initial travel purchase is a flight and the additional packaged travel item is a lodging stay, the rules may require that the lodging be located within a selected distance (e.g., a radius) from at least one of the departure location or arrival location of the flight. In another example, assuming that the initial travel purchase is a flight and the additional travel item is an event, such as a concert, the rules may require that the location of the concert is within a selected distance of at least one of the departure or arrival airport.

In another aspect, the package component 122 may obtain rules which specify the correspondence between respective travel items based upon their duration of use. Specifically, the respective travel items may be required to possess dates of use that start and/or finish within a selected time period of each other. Dates of use may be based upon one or more of departure, arrival, pickup, drop-off, check-in, check-out, and when using the travel items, as well as dates of scheduled activities. For example, continuing the example above using flights and lodging, lodging corresponding to the purchased flight may include a lodging stay for a time period that lies between an arrival date and a departure date of the purchased flight.

In a further aspect, the package component 122 may obtain rules which specify the correspondence between respective travel items based upon the total number of deferred travel packages sold by the network travel package service 102. For example, the network travel package service 102 may be allocated a selected number of travel items (e.g., total number of bookings) which may be included within deferred travel packages. Should the selected number of travel items be sold, no further deferred travel packages may be generated by the network travel package service 102.

In other aspects, the package component 122 may obtain rules which specify a selected number of a specific type of travel items (e.g., lodging) which may be included within deferred travel packages offered by the network travel package service 102. When the selected number of the specific travel items are purchased for inclusion in deferred travel packages, no additional deferred travel packages may be generated using that type of additional travel item. Within these limits, however, deferred travel packages including other types of additional packaged travel items may still be generated by the network travel package service 102, within the restrictions of their respective rules. It may be understood that these rules are presented for illustrative purposes and may be altered as desired without departing from the disclosed embodiments.

In further alternative embodiments, rules governing the eligibility of additional packaged travel items, such as those outlined above, may also be relaxed. In this manner, more travel items may be established as corresponding to an initial travel item purchase, enabling the network travel package service 102 to provide travel package discounts for many combinations of travel items which would not be allowed under stricter rules. In one instance, rules regarding dates of use of travel items may be relaxed such that additional packaged travel items may be used for a time period that lies beyond the dates of use of the initial travel item purchase. For example, a lodging stay may be allowed to continue beyond the departure date of a flight. In another instance, rules regarding locations of use of travel items may be relaxed such that additional packaged travel items may be used at a location which is farther in distance from the initial travel item purchase. For example, an auto rental may be allowed to take place within a selected distance (e.g., radius) of an arrival and/or departure airport which is much larger than that allowed under an unrelaxed condition.

The package component 122 may further obtain rules that enable pricing of deferred travel packages. In one aspect, the rules may determine a base travel package price from the sum of the prices offered for the component travel items. In a further aspect, a discount may be applied to the generated travel packages which reduce the price of the deferred travel package as compared to the base travel package. The discount may be based upon the difference between a package cost of the additional travel item and a stand-alone cost of the additional travel item. In certain embodiments, the package cost and stand-alone cost for travel items may be retrieved from the data store 114. In further embodiments, the price of the deferred travel package may be less than or equal to the cost of the base travel package (e.g., the cost of the items included in the travel package when purchased as stand-alone items).

Beneficially, even when the deferred travel package cost is approximately equal to the cost of the base travel package, purchase of the deferred travel package may still provide benefits as compared to travel items purchased as stand-alone items over and above cost. For example, travel items purchased as a travel package may appear on a single itinerary. Further, travel items purchased as a travel package may be grouped with a single confirmation number for ease of check in and/or check out, changes, cancellations, refunds, and the like.

The amount of the discount may also be varied. In one embodiment, the amount of the discount may be varied based upon time. In one embodiment, the discount may be reduced by an amount depending upon the duration of time remaining before the initial date of use of the initial travel item purchase. In another embodiment, the discount may be reduced by a selected amount as the duration of time between purchase of the first travel item and the travel package increases. In a further embodiment, the discount may be reduced by a selected amount as the duration of time from the date of offer of the travel package increases. For example, should the traveler purchase an additional packaged travel item within a selected period of time from purchase of the initial travel item (e.g., within about 24 hours), the full amount of the discount may be applied to the price of the travel package. Alternatively, the discount may be reduced by a total of about 50% should about 7 days elapse from purchase of the initial travel item. In another example, the discount may be reduced by a total of about 75% should about 14 days elapse from purchase of the initial travel item. The amount of the reduction in the discount may be continued until, at selected period of time prior to the use of the initial travel item (e.g., departure of a flight, first night stay in a lodging, first day of an auto rental, etc.), the amount of the discount may be reduced to approximately zero.

In embodiments discussed above, the network travel package service 102 may provide the travel package for purchase prior to first use of the first travel item. In alternative embodiments, the network travel package service 102 may also provide deferred travel package options for traveler consideration while the initial travel item purchase is being used. Deferred travel package options may be extended after first use of the initial travel item and before the last use of the initial travel item purchase. For example, assuming that the initial travel item purchase is a flight, a deferred travel package option may be made for an auto rental after the traveler has departed on their flight. The time period over which a discounted auto rental may be purchased may be selected between the date and time that the traveler's flight departs and returns.

The deferred travel packages generated by the network travel package service 102 may be further provided to the user computing device 106 to allow the traveler to review and select a generated deferred travel package for purchase. To facilitate the traveler's review, the travel package component 122 may format the generated deferred travel package to display, not only the information regarding the traveler's initial travel item purchase and prospective purchase of additional packaged travel items, but also display of the price of the deferred travel package as compared to purchasing the component travel items as stand-alone items and the savings which may be obtained by purchasing the deferred travel package.

Figure 2A:
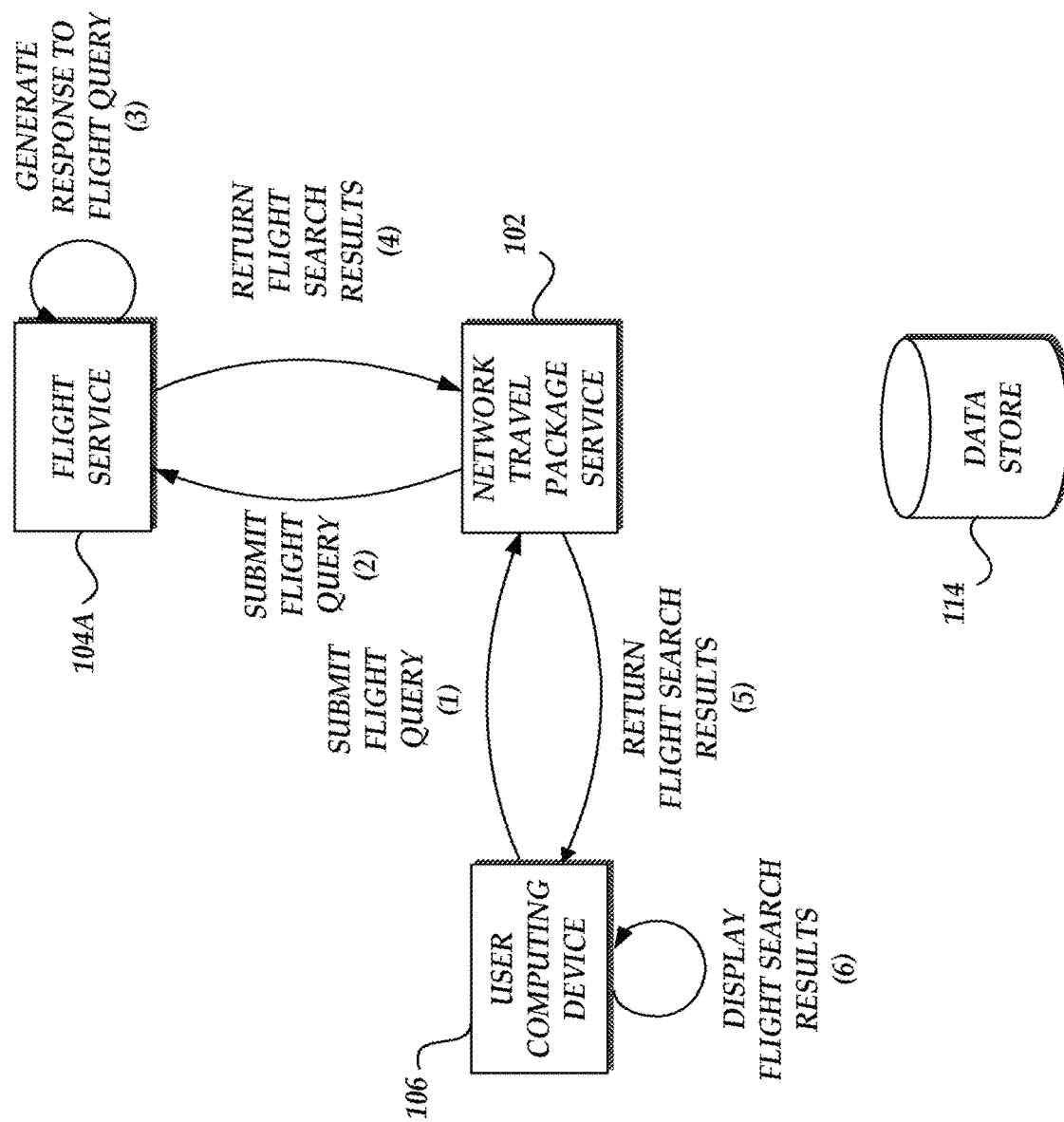
FIG. 2A is a block diagram of the operating environment of FIG. 1, illustrating the network travel package service returning travel item options (e.g., flights, lodging, etc.) for initial purchase in response to a search query received from the user computing device.
Figure 2B:
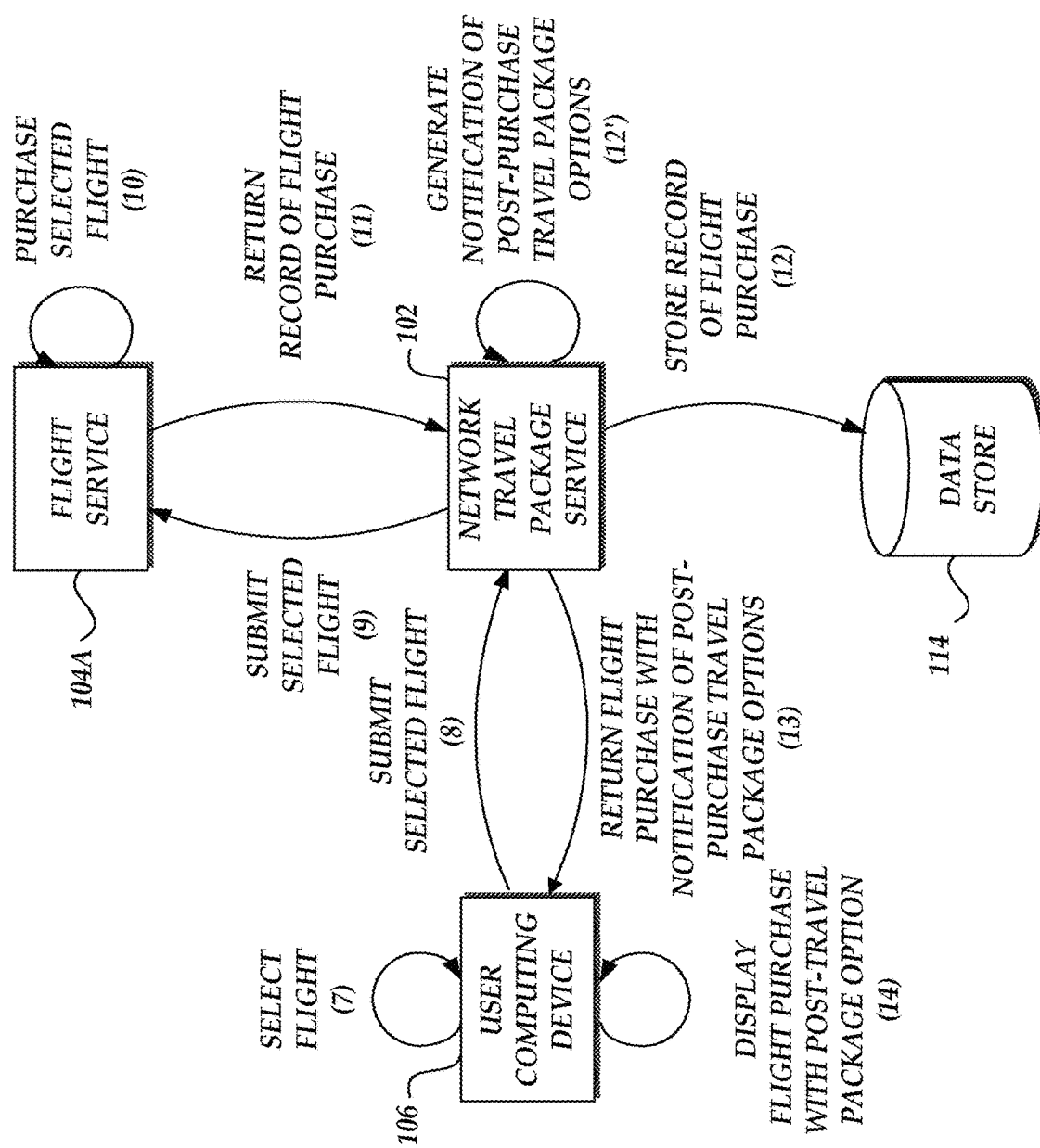
FIG. 2B is a block diagram of the operating environment of FIG. 1, illustrating the network travel package service detecting the purchase of an initial travel item without the purchase of a corresponding travel item (e.g., a flight without corresponding lodging) and returning one or more options for a deferred travel package that include the initial travel item purchase and one or more corresponding travel items.

FIGS. 2A-2B are block diagrams of the operating environment of FIG. 1, illustrating the purchase of an initial travel item, such as a flight, by a traveler employing his or her user computing device 106 in communication with the network travel package service 102. Further illustrated is the return of a deferred travel package offer by the network travel package service 102 to the user computing device 106 that enables the traveler to separately purchase one or more additional packaged travel items, such as lodging, during the same session as the initial travel item purchase. Those of ordinary skill in the art will appreciate that, while flights and lodging are used below to illustrate embodiments of the present disclosure, other combinations of travel items may be employed without limit. While initial travel package purchases are described below in as being made through the network travel package service 102, it may be understood that embodiments of the network travel package service 102 may be employed with the initial travel item purchases made through services other than the network travel package service 102. Such services may include networked (e.g., online) services that enable purchase of travel items or offline services that enable purchases of travel items (e.g., purchases in person, by phone, and/or by mail).

As illustrated in FIG. 2A, a traveler may employ his or her user computing device 106 to communicate with the network travel package service 102 to submit a search query for flights (e.g., a flight query). Communication between the user computing device 106 and the network travel package service 102 begins a session. The flight query may detail one or more flight attributes desired by the traveler, including, but not limited to, departure and arrival airports, date and time of departure, class of service, airline, seat assignments and the like. The flight query may be communicated to the flight service 104A from the network travel package service 102.

The flight service 104A may generate a response to the flight query upon receipt. The flight service 104A may search one or more fare, schedule, rule and availability records for flights that satisfy the flight query. Flights that satisfy the flight query may be returned by the flight service 104A to the network travel package service 102. The network travel package service 102 may further format these flight query search results (e.g., into a user interface displayable by the user computing device 106) and return them to the user computing device 106 for subsequent display. The formatted flight query search results may be further configured so as to allow the traveler to perform actions such as selecting a flight for purchase, modifying the prior submitted flight query, submitting a new flight query, submitting a query for a new travel item, and other search operations known in the art.

As further illustrated in FIG. 2B, the traveler may select a flight from the returned search results for purchase. The selected flight may be submitted from the user computing device 106 to the flight service 104A, via the network travel package service 102. Upon receipt of the selected flight, the flight service 104A may perform operations necessary to purchase the flight and transmit a record of the purchase to the network travel package service 102. The network travel package service 102 may store the travel purchase record in the data store 114 and/or a storage device local to the network travel package service 102. The stored record may be concurrently reviewed and/or subsequently retrieved, as necessary, by the network travel package service 102.

For example, in certain embodiments, the network travel package service 102 may analyze the travel purchase record to determine if the travel purchase contains an initial travel item purchase. Should the travel purchase include an initial travel item purchase, the network travel package service 102 may generate a notification that deferred travel package options are available for the traveler's consideration. In one embodiment, the notification may be included in a user interface generated by the network travel package service 102. In one embodiment, the user interface may be a message that confirms that the flight has been purchased. Selection of a link contained within the notification may further enable the network travel package service to provide the traveler with a search user interface for performing search and purchase of additional packaged travel items. In another embodiment, the generated user interface may be the search user interface itself, including the notification. The generated user interface may be formatted for viewing by the network travel package service 102 and transmitted to user computing device 106 for display.

Figure 3:
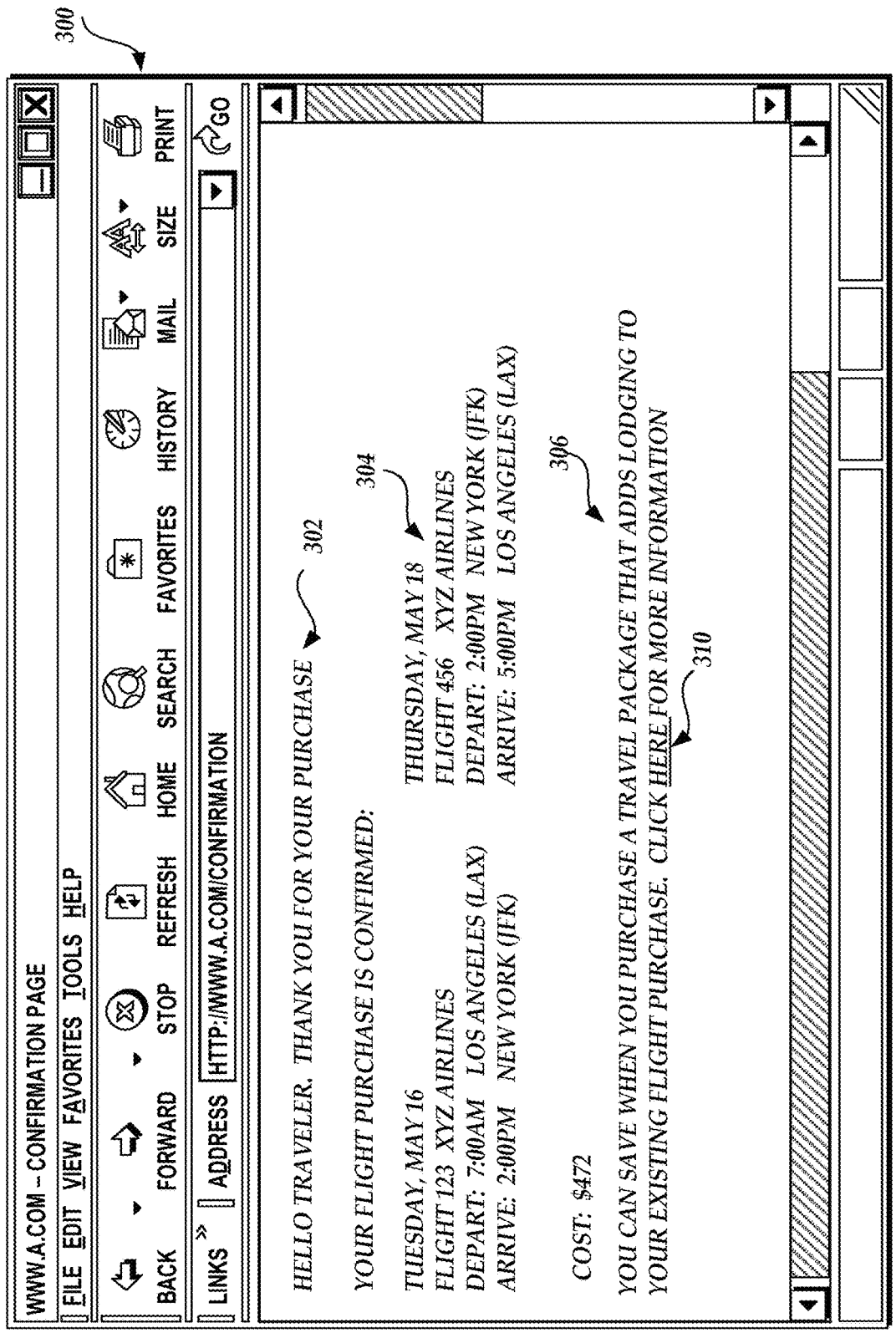
FIG. 3 is an illustrative user interface for display on the user computing device that includes confirmation of purchase of an initial travel item.

FIG. 3 illustrates one embodiment of a user interface 300 that is displayed on the user computing device 106 for confirmation of the purchase of the flight. The user interface 300 may include a personalized greeting 302 thanking the traveler for their purchase. The user interface 300 may further include a confirmation 304 of their purchase. The confirmation 304 may include the details of the travel item purchased. For example, in the case of the flight illustrated in FIG. 3, the details may include the dates and times of arrival and departure, the airline and flight number, the respective arrival and departure airports, and the price of the flight. Further information may include fare class, seat assignment, gate assignment, boarding time and the like.

The user interface 300 may additionally include a deferred travel package option notification 306. For example, the notification 306 may indicate that savings may be obtained when purchasing a travel package that includes additionally purchased lodging and the purchased flight. The user interface 300 provided by the network travel package service 102 may further include a link 310, such as a hypertext link, that enables network travel package service to provide the traveler with the search user interface to perform a search for additional packaged travel items, such as lodging.

Figure 4A:
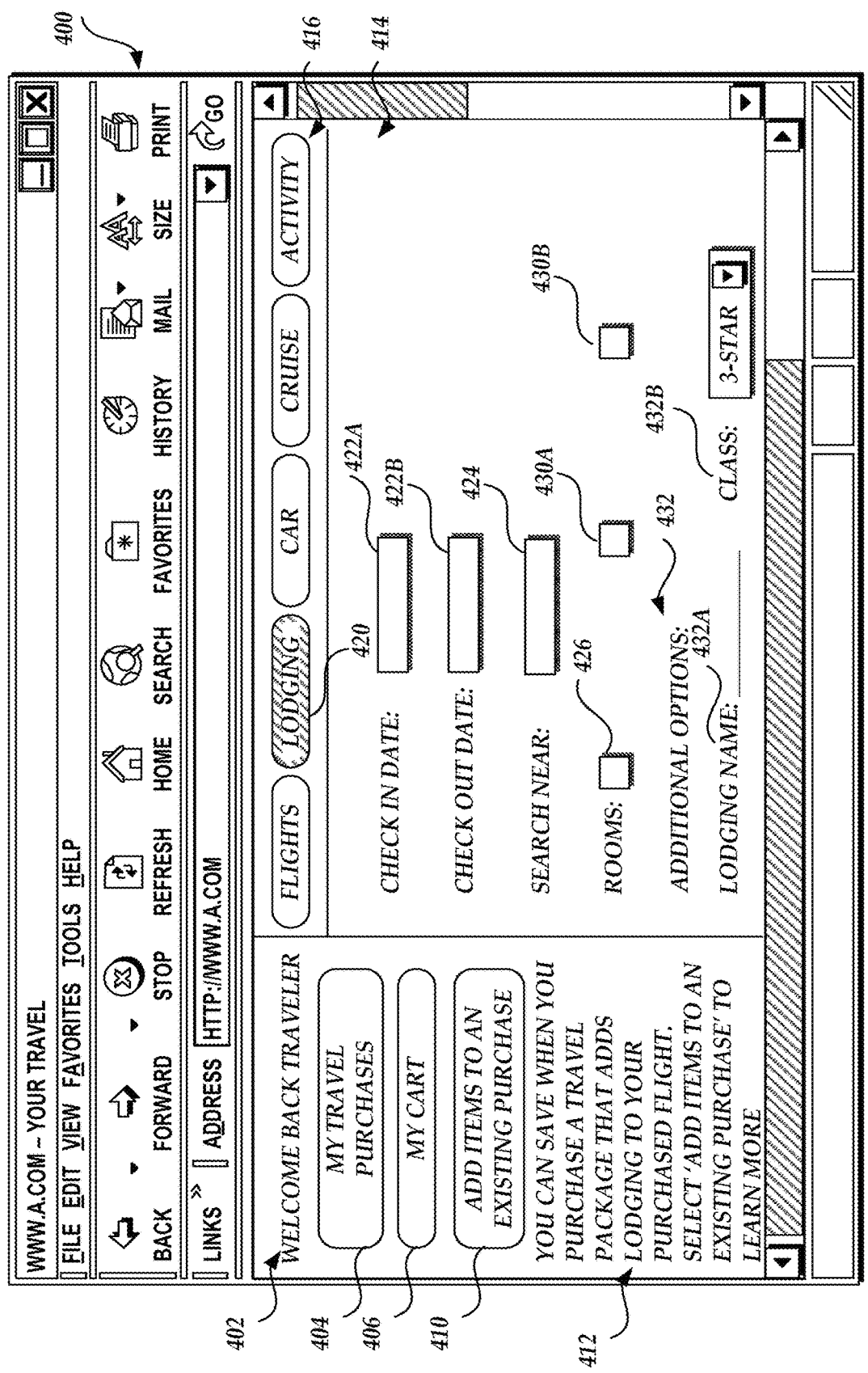
FIG. 4A is an illustrative user interface for display on the user computing device that notifies the user of the possibility of adding one or more corresponding travel items to the initial travel item purchase.

FIG. 4A illustrates an alternative embodiment of a search user interface 400 displayed on the user computing device 106 which enables a traveler to purchase additional packaged travel items. As discussed above, the search user interface 400 may be provided to the user computing device 106 in response to selection of the link 310 in the user interface 300 or may be provided to the user computing device 106 directly in response to the initial travel item purchase. The user interface 400 includes a travel summary window 402 that is personalized to the traveler. In certain embodiments, the travel summary window 402 may include a user interface control 404 that enables the traveler to access his or her purchased travel items. In other embodiments, the travel summary window 402 may include a user interface control 406 that enables the traveler to access travel items which have been saved in a cart for future purchase. In additional embodiments, the travel summary window 402 may include a user interface control 410 that enables the traveler to add items to an existing trip. In further embodiments, the travel summary window 402 may include a notification 412 indicating that savings are available when purchasing lodging in conjunction with an already purchased flight.

The user interface 400 may further include a search window 414 for performing searches for one or more travel items. The search window 414 may include a selection window 416 including user interface controls 420 that enable the traveler to identify the type of additional travel item (e.g., flights, lodging, autos, activities, and the like) for which a search should be performed. For example, selection of a search for lodging using the user interface control 416 may cause display of one or more fields 422-432 for entry of parameters detailing a lodging search query. Examples of such fields may include, but are not limited to, check-in and check-out dates 422A-422B, a location to search near 424 (e.g., a city, airport, landmark, etc.), number of rooms 426, number of adults and children, 430A-430B, and additional options 432, such as lodging name 432A and class 432B.

In certain embodiments, one or more of the fields 422A-422B, 424, 430A-430B, 432, 432A-432B may be automatically filled in based upon the initial travel item purchase. For example, assuming the initial travel item purchase is a flight, the check-in and check-out dates 422A-422B may be entered using the departure and return dates for the flight. In another example, also assuming the initial travel item purchase is a flight, the location to search near 424 may be entered using one of the departure or return airports for the flight.

Figure 4B:
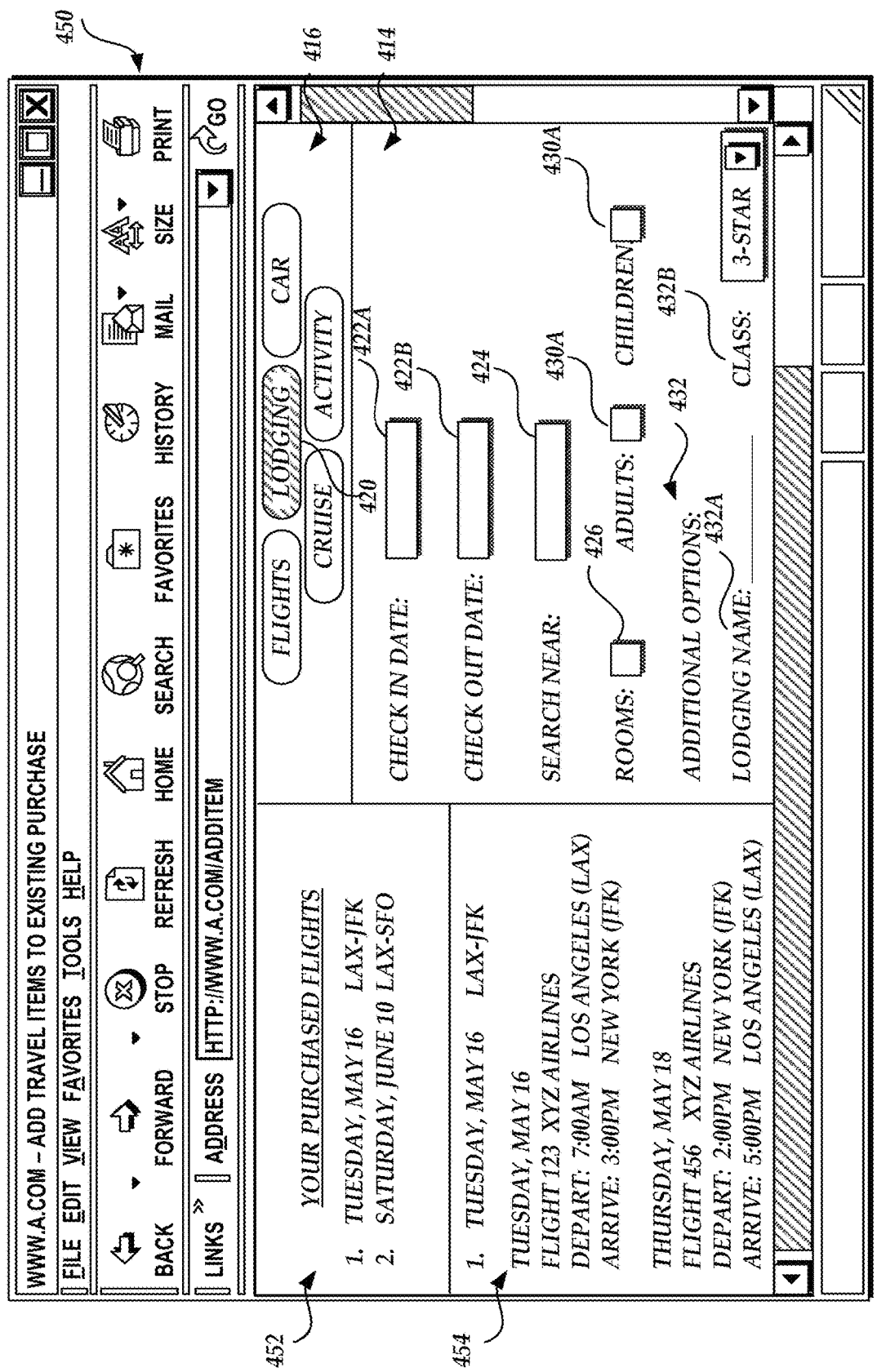
FIG. 4B is an illustrative user interface for display on the user computing device that prompts the user to submit a search query for one or more corresponding travel items that may be included with the initial travel item purchase in a deferred travel package.

FIG. 4B illustrates one embodiment of the user interface 450 that is displayed on the user computing device 106 in response to selection of the user interface control 410 for combining additional packaged travel items to an existing purchase (e.g., an initial travel item purchase). For example, the user interface 450 may include a flight purchase window 452 that displays a list of the traveler's pending flights that are purchased within the current session for inclusion within a deferred travel package (e.g., initial travel item purchases). The initial travel item purchases may be identified by review of the traveler's purchases during the session. Flights displayed in the flight purchase window 452 may be selected and displayed in a flight detail window 454 for review. The user interface 450 may further include the search window 414 for submission of search queries to be added to a travel item (e.g., lodging) selected from the flight purchase window 452. The fields within the search window 414 (e.g., 422A-422B, 424, 430A-430B, 432, 432A-432B) may also be automatically filled in based upon the initial travel item purchase selected in flight purchase window 452, as discussed above. As described below, deferred travel packages are generated from lodging returned in response to search queries entered in user interface 450 and the flight selected in flight purchase window 452. It may be understood that flights and lodging are illustrated as examples of travel items which may be displayed in the user interfaces 400, 450, however, other travel items may be combined in deferred travel packages without limit.

As discussed above, in one embodiment, the user interfaces 300, 400, 450 provided by the network travel package service 102 may be transmitted to the traveler's user computing device 106 after the flight purchase and prior to navigation away from the network travel package service 102. As a result, subsequent purchase of additional lodging, without intermediate navigation away from the network travel package service 102, may be considered as being performed within a single session.

In alternative embodiments, however, the travel package service 102 may be configured to provide deferred travel packages including additional lodging options such that the flight and the additional lodging options are purchased separately during multiple sessions. In the embodiments discussed below, it is assumed that the traveler navigates away from the network travel package service 102 ending the session including the flight purchase. As such, subsequent purchases of travel packages including additional packaged travel items described below take place in a different session than the flight purchase.

Figure 5B:
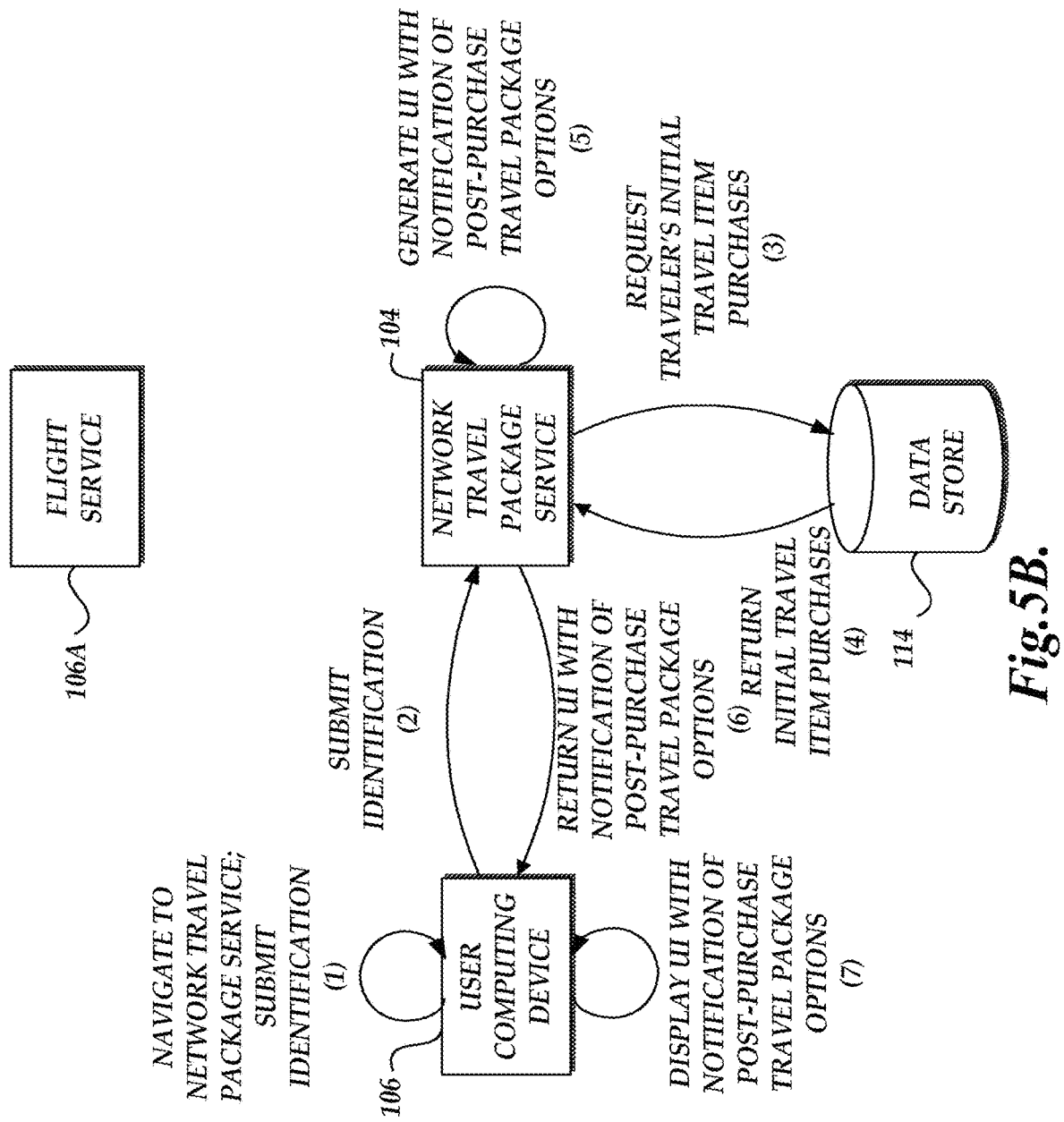
FIG. 5B is a block diagram of the operating environment of FIG. 1, illustrating the network travel package service generating a user interface for display on the user computing device that includes deferred travel package options.

As illustrated in FIGS. 5A and 5B, in one embodiment, after a flight has been selected and purchased by the traveler, the network travel package service 102 may request records of travel purchases stored by the data store 114. In one embodiment, the network travel package service 102 may analyze the travel purchase records for any travel purchases which include an initial travel item purchase, such as a flight. Upon detection of an initial flight purchase, the network travel package service 102 may generate and transmit a message that includes a deferred travel package offer to the user computing device 106.

Upon receiving the message, the user computing device 106 may display the message to enable the traveler to review and respond to the message. In one embodiment, the message may include an electronic mail message. It may be understood that the message may include other forms of messaging technologies, including short message service (SMS) messages, instant messages (IM), and hypertext markup documents (HTML).

In certain embodiments, the contents of the message may be similar to that discussed above with respect to user interface 300, regarding confirmation of the purchase of a flight, with the exception that references to purchase confirmation may be removed. In this manner, the traveler may return to the user for submission of a search query for additional packaged travel items.

FIG. 5B illustrates another block diagram of the operating environment of FIG. 1, illustrating the network travel package service providing a user interface including a notification of the deferred travel package offers available to the traveler in response to navigation of the traveler to the network travel package service 102 after the initial flight purchase. The traveler may return to the network travel package service 102 in response to a message, as discussed above or may navigate to the network travel package service 102 independently. Upon return navigation to the network travel package service 102, the traveler may submit information verifying their identity. Such information may include, but is not limited to, a login, authentication files (e.g., web browser cookies), and other authentication methods known in the art. After verifying the identity of the traveler, the network travel package service 102 may retrieve the traveler's travel item purchases from the data store 114 and analyze the purchases to identify any initial travel item purchases. The network-travel package service 102 may generate a user interface including the traveler's initial travel item purchases and the notification, and return the user interface to the user computing device 106. In certain embodiments, the user interface may comprise user interface 400.

In certain embodiments, instead of, or in addition to, placement within the travel summary window 402, the notification may be provided when the traveler performs a triggering event while navigating within the network travel package service 102. In one embodiment, the triggering event may include performing a search for travel inventory after purchase of an initial travel item. When the search is initiated, for example, by selecting a type of travel item to search for in search window 416 and/or by entering fields in a search dialog box of search window 416, a new user interface (e.g., a pop-up window) may be generated that includes the savings message 412. In another embodiment, the triggering event may include reviewing an itinerary of an initial travel item purchase accessed via the user interface control 404. For example, upon selection of a previously identified initial travel item purchase, the network travel package service 102 may insert a discount travel package offer in the itinerary, providing the traveler with an enhanced itinerary. In some embodiments, the itinerary is included in the user interface 300 instead of a confirmation.

In the embodiments discussed above with respect to FIGS. 2B, 3, 4A, and 4B, the deferred travel package option is provided to the traveler by the network travel package service 102 after the flight purchase but before the traveler navigates away from the network travel package service 102. Thus, assuming that the traveler does not navigate away from the network travel package service prior to purchase of additional packaged travel items, any purchase of additional packaged travel items will be made within the same session as the initial flight purchase. In contrast, in the embodiments discussed above with respect to FIGS. 5A-5B, the deferred travel package offer is provided after the traveler has made a flight purchase and navigated away from the network travel package service 102. Thus, any purchase of additional packaged travel items may be made in a session different than that of the initial flight purchase.

Figure 6:
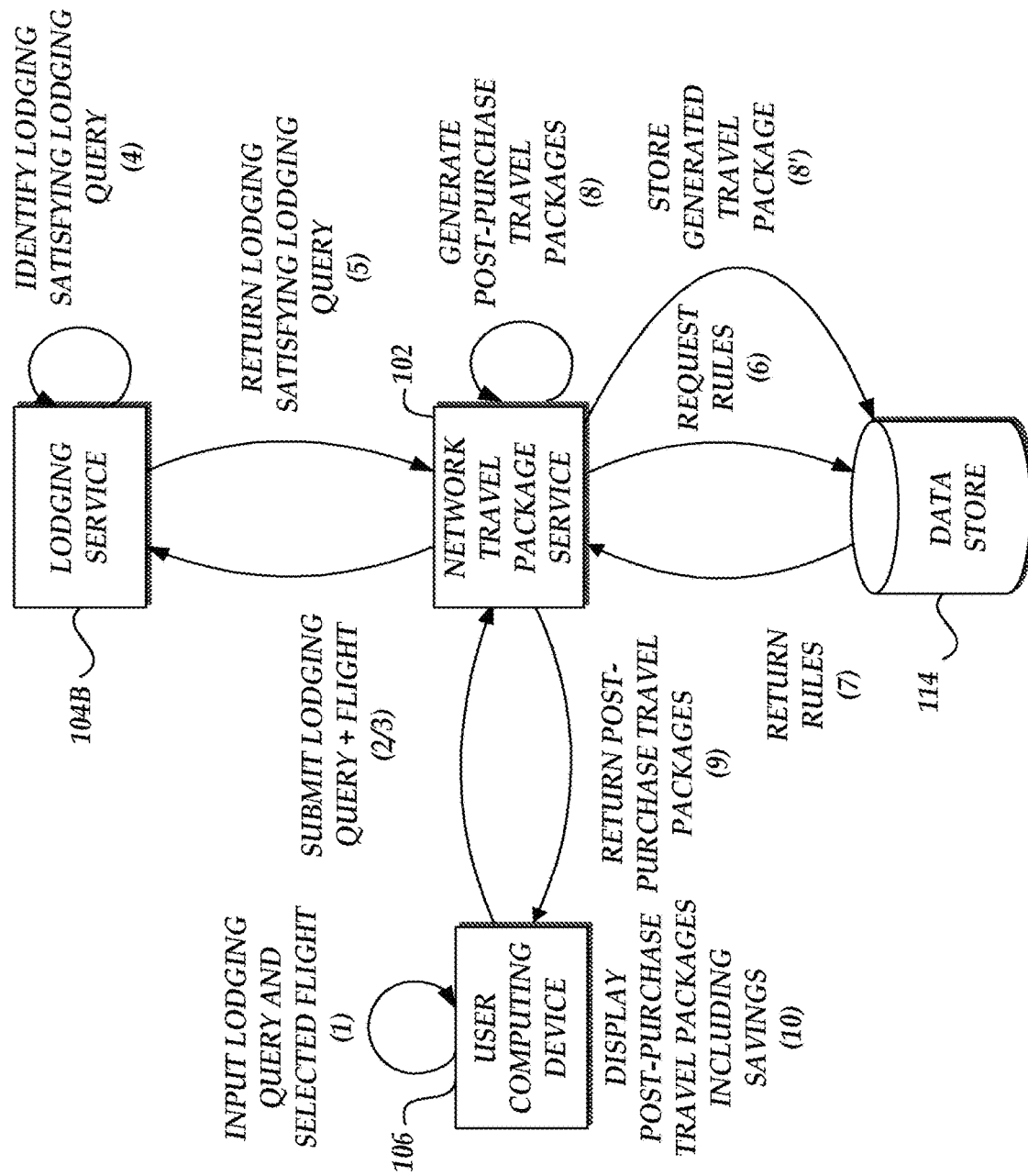
FIG. 6 is a block diagram of the operating environment of FIG. 1, illustrating the network travel package services returning deferred travel package options to the user computing device in response to submission of a search query for travel items corresponding to the initial travel item purchase.

Upon submission of a search query by the traveler using his or her user computing device 106 to identify additional packaged travel items, the search query may be directed to the appropriate inventory service 104A-104D. FIG. 6 is a block diagram of the operating environment of FIG. 1 illustrating the user computing device submitting a lodging request to the network travel package service 102. The lodging request may include the lodging parameters input in user interfaces 400, 450, as discussed above, as well as the flight to be included with additional lodging returned from the search results in a deferred travel package. The network travel package service 102 may in turn direct the search query directly to the lodging service 104B, which may identify one or more lodging satisfying the lodging query and return the results to the network travel package service 102.

Upon receiving the search query results, the network travel package service 102 may retrieve rules regarding the initial travel item purchase and one or more corresponding items selected for purchase (e.g. a flight and corresponding lodging) in order to generate one or more deferred travel packages. The rules, in one embodiment, may be stored in the data store 114. As discussed above, the rules may identify combinations of the previously purchased flight and lodging options that correspond to one another and are thus eligible for combination in a deferred travel package. The rules may further identify the pricing of travel packages including the respective travel items. The generated deferred travel package may be further stored in the data store for later retrieval, as discussed in greater detail below, and transmitted to the user computing device 106 for display. The network travel package service 102 may format the generated deferred travel packages for display by the user computing device 106 to emphasize the savings achieved when purchasing the additional lodging in addition to the previously purchased flight as a deferred travel package. In further embodiments, the rules may additionally comprise policies regarding changes and/or cancellation to which the generated package may be subject. The change and/or cancellation policies may be displayed to the user prior to purchase of a travel package.

In alternative embodiments, upon receipt of the search query results, the network travel package service 102 may search a cache of previously generated deferred travel packages maintained by the data store 114. For example, in one embodiment, previously generated and cached deferred travel packages may include those deferred travel packages generated in response to received search queries. In alternative embodiments, previously generated and cached deferred travel packages may include deferred travel packages generated by the network travel package service 102 for popular combinations of travel items and locations and dates of use. By providing a variety of cached deferred travel packages for prior searches and anticipated popular deferred travel packages, the likelihood that a search query may be satisfied by a cached deferred travel package is significant. Thus, the number of deferred travel packages that may need to be generated in real-time may be significantly reduced, decreasing the computing burden placed upon the network inventory services 104A-104D and the network travel package service 102.

Figure 7:
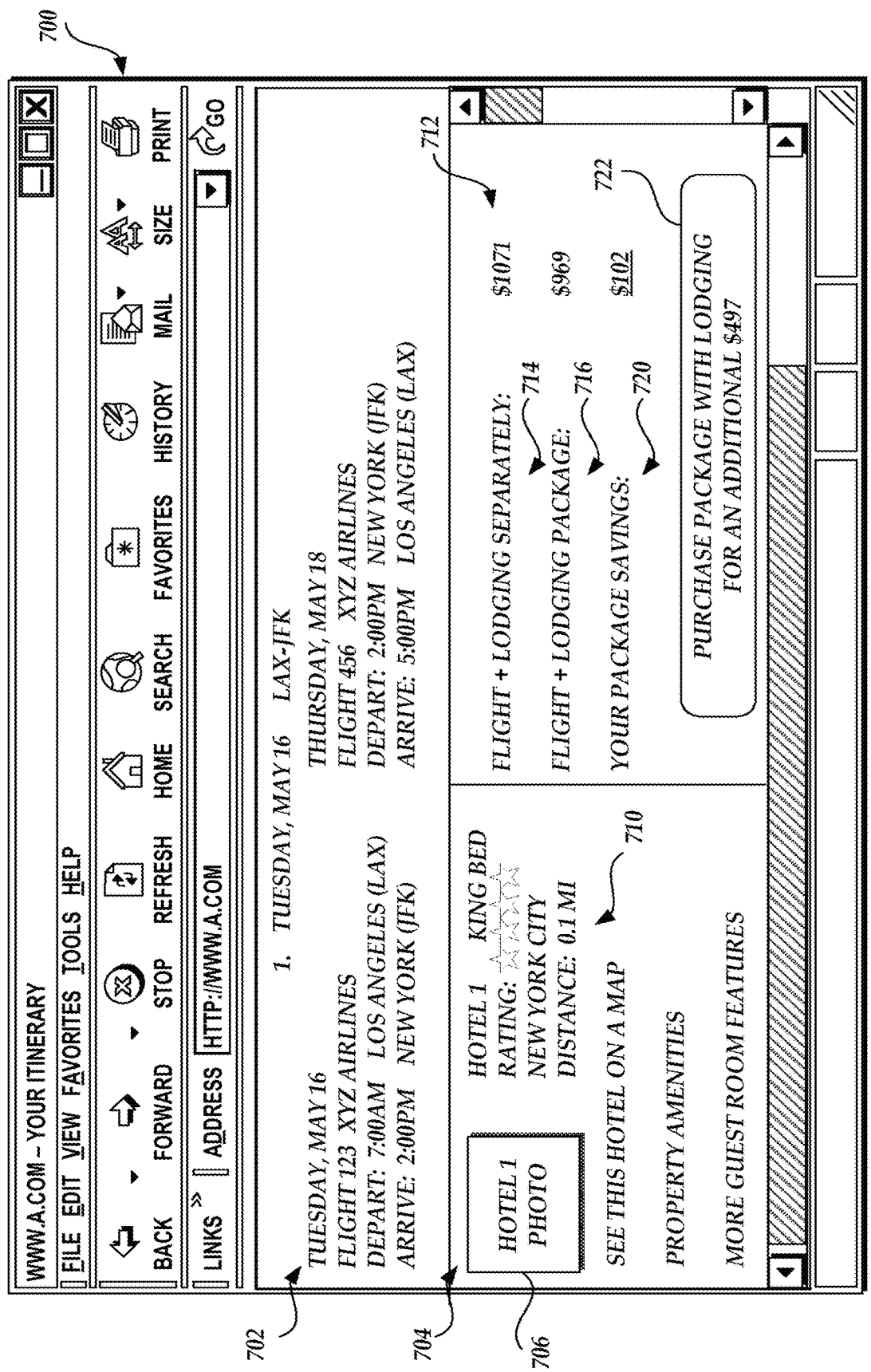
FIG. 7 is an illustrative user interface for display on the user computing device that presents the deferred travel package options for review by the traveler.

FIG. 7 illustrates one embodiment of a user interface 700 displayed on the user computing device 106 that enables the traveler to review and select generated deferred travel packages for purchase. The user interface 700 may include a flight detail window 702 that includes details regarding the purchased flight selected from flight purchase window 502 discussed above. The user interface 700 may further include a lodging information window 704. The lodging information window 704 may include details regarding the lodging including a picture 706 and biographic information 710 such as name, bed information, star rating, location and distance from selected location, as well as mapping functions, listing of property amenities, and room features.

The user interface 700 may additionally include a deferred travel package window 712. The deferred travel package window may provide a variety of pricing information. In one embodiment, the deferred travel package window 712 may include the stand-alone price 714, the price of the flight and lodging purchased separately as stand-alone items. In another embodiment, the deferred travel package window 712 may include the travel package price 716, the price of the flight and lodging purchased separately but as part of the deferred travel package. In further embodiments, the deferred travel package window 712 may display the savings 720 when purchasing the deferred travel package as compared to the travel items as stand-alone items. The user interface 700 may additionally include a user interface control 722 that enables the traveler to select a deferred travel package for purchase.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a data store configured to store travel items; and
   a processor in communication with the data store, wherein the processor executes computer-executable instructions that, when executed, configure the processor to perform operations including:
   during a current computing session with a current computing device associated with a traveler,
      receiving a travel item query;
      identifying a first travel item that was booked by the traveler during a prior computing session with a prior computing device, wherein the current computing session is separate from the prior computing session;
      without additional input by the traveler, determining at least one of a temporal criterion related to the first travel item or a positional criterion related to the first travel item;
      automatically modifying the travel item query to form a modified travel item query, wherein the modified travel item query includes at least one of the temporal criterion related to the first travel item or the positional criterion related to the first travel item;
      executing the modified travel item query to identify potential search results including a first travel package from the data store, wherein the first travel package includes (i) the first travel item that was booked by the traveler prior to receiving the travel item query, and (ii) a second travel item from the data store, and wherein;
         when the modified travel item query includes the temporal criterion, the second travel item of the first travel package is usable within a time threshold of the temporal criterion, and
         when the modified travel item query includes the positional criterion, the second travel item of the first travel package is usable within a threshold distance of the positional criterion; and
      outputting at least the first travel package as a search result responsive to the travel item query.

2. The system of claim 1, wherein the temporal criterion specifies at least one of a duration of use of the first travel item or a date of use of the first travel item.

3. The system of claim 1, wherein the positional criterion specifies at least one of a location of a travel item or a distance between travel items.

4. The system of claim 1, wherein:
   the potential search results include a second travel package,
   the second travel package includes (i) the first travel item that was booked by the traveler during the prior computing session, and (ii) a third travel item from the data store, and
   the third travel item satisfies the modified travel item query; and
   outputting at least the first travel package as the search result responsive to the travel item query further includes outputting the second travel package as the search result responsive to the travel item query.

5. The system of claim 1, wherein the current computing device and the prior computing device are a same computing device.

6. A computer-implemented method as implemented by a processor configured with specific computer-executable instructions, the computer-implemented method comprising:
   receiving, from a computing device, a travel item query submitted on behalf of a traveler via a search interface presented by the computing device;
   identifying a first travel item that was booked by the traveler prior to receiving the travel item query;
   without additional input by the traveler, determining at least one of a temporal criterion related to the first travel item or a positional criterion related to the first travel item;
   automatically modifying the travel item query to form a modified travel item query, wherein the modified travel item query includes at least one of the temporal criterion related to the first travel item or the positional criterion related to the first travel item;
   executing the modified travel item query to identify a first travel package, wherein the first travel package includes (i) the first travel item booked by the traveler prior to receiving the travel item query, and (ii) a second travel item, and wherein:
      when the modified travel item query includes the temporal criterion, the second travel item of the first travel package is usable within a time threshold of the temporal criterion, and
      when the modified travel item query includes positional criterion, the second travel item of the first travel package is usable within a threshold distance of the positional criterion; and
   outputting one or more search results responsive to the travel item query for presentation by the search interface, the one or more search results including the first travel package.

7. The computer-implemented method of claim 6, wherein executing the modified travel item query to identify the first travel package comprises:
  executing the modified travel item query to identify a plurality of travel packages, wherein the plurality of travel packages includes the first travel package, and wherein each travel package of the plurality of travel packages includes (i) the first travel item booked by the traveler prior to receiving the travel item query, and (ii) another travel item that satisfies the modified travel item query; and
  identifying, from the plurality of travel packages, the first travel package.

8. The computer-implemented method of claim 7, wherein the plurality of travel packages includes a second travel package, and wherein the one or more search results responsive to the travel item query include the second travel package.

9. The computer-implemented method of claim 6, wherein executing the modified travel item query to identify the first travel package further comprises:
  determining that the second travel item satisfies the modified travel item query; and
  determining that the second travel item satisfying the modified travel item query and the first travel item that was obtained by the traveler prior to receiving the travel item query can be combined into the first travel package.

10. The computer-implemented method of claim 7, wherein executing the modified travel item query to identify the plurality of travel packages further comprises:
  determining that each travel package in the plurality of travel packages satisfies a rule governing which other travel items can be combined into a travel package with the first travel item that was obtained by the traveler prior to receiving the travel item query.

11. The computer-implemented method of claim 6, wherein the positional criterion specifies one or more of a location of travel items or a distance between travel items.

12. The computer-implemented method of claim 6, wherein the temporal criterion specifies at least one of a duration of use of the first travel item or a date of use of the first travel item.

13. The computer-implemented method of claim 6, wherein the first travel item was obtained by the traveler during a first computing session, wherein the travel item query is received, and the first travel package is output during a second computing session, and wherein the second computing session is subsequent to the first computing session.

14. The computer-implemented method of claim 6 further comprising:
  generating an electronic invitation to conduct the travel item query based at least in part on the first travel item obtained by the traveler, wherein the electronic invitation includes a link to the search interface; and
  transmitting, to the computing device, the electronic invitation to conduct the travel item query.

15. The computer-implemented method of claim 6 further comprising associating a confirmation code of the first travel item that was booked by the traveler with the second travel item of the first travel package.

16. A non-transitory, computer-readable storage medium including computer-executable instructions that, when executed by a processor, cause the processor to perform operations including:
  receiving a travel item query that was submitted on behalf of a traveler via a search interface;
  identifying a first travel item that was booked by the traveler prior to receiving the travel item query;
  without additional input by the traveler, determining at least one of a temporal criterion related to the first travel item or a positional criterion related to the first travel item;
  automatically modifying the travel item query to form a modified travel item query including at least one of the temporal criterion related to the first travel item or the positional criterion related to the first travel item;
  executing the modified travel item query to identify a first travel package, wherein the first travel package includes (i) the first travel item booked by the traveler and (ii) a second travel item, and wherein:
    when the modified travel item query includes the temporal criterion, the second travel item of the first travel package is usable within a time threshold of the temporal criterion, and
    when the modified travel item query includes positional criterion, the second travel item of the first travel package is usable within a threshold distance of the positional criterion;
  outputting the second travel item as a search result corresponding to the travel item query.

17. The non-transitory, computer-readable storage medium of claim 16, wherein automatically modifying the travel item query to form the modified travel item query comprises determining the temporal criterion or the positional criterion based at least in part on an attribute of the first travel item.

18. The non-transitory, computer-readable storage medium of claim 16, wherein the first travel item was booked by the traveler during a first session, and wherein the travel item query was submitted on behalf of the traveler during a second session subsequent to the first session.

19. The non-transitory, computer-readable storage medium of claim 16, wherein the first travel package is identified based at least in part on a set of rules for assembling deferred travel packages.

20. The non-transitory, computer-readable storage medium of claim 19, wherein the set of rules identifies travel items that correspond to each other and are eligible for combination.

21. The non-transitory, computer-readable storage medium of claim 20, wherein the operations further include determining that the first travel item booked by the traveler and the second travel item satisfy the set of rules.

* * * * *